Aug. 15, 1950   R. H. BARNARD   2,518,744
APPARATUS FOR MAKING STAPLE FIBERS
Filed March 21, 1946   2 Sheets-Sheet 1

INVENTOR
RANDOLPH H. BARNARD
BY
Toulmin & Toulmin
ATTORNEYS

Aug. 15, 1950          R. H. BARNARD          2,518,744
APPARATUS FOR MAKING STAPLE FIBERS
Filed March 21, 1946          2 Sheets-Sheet 2
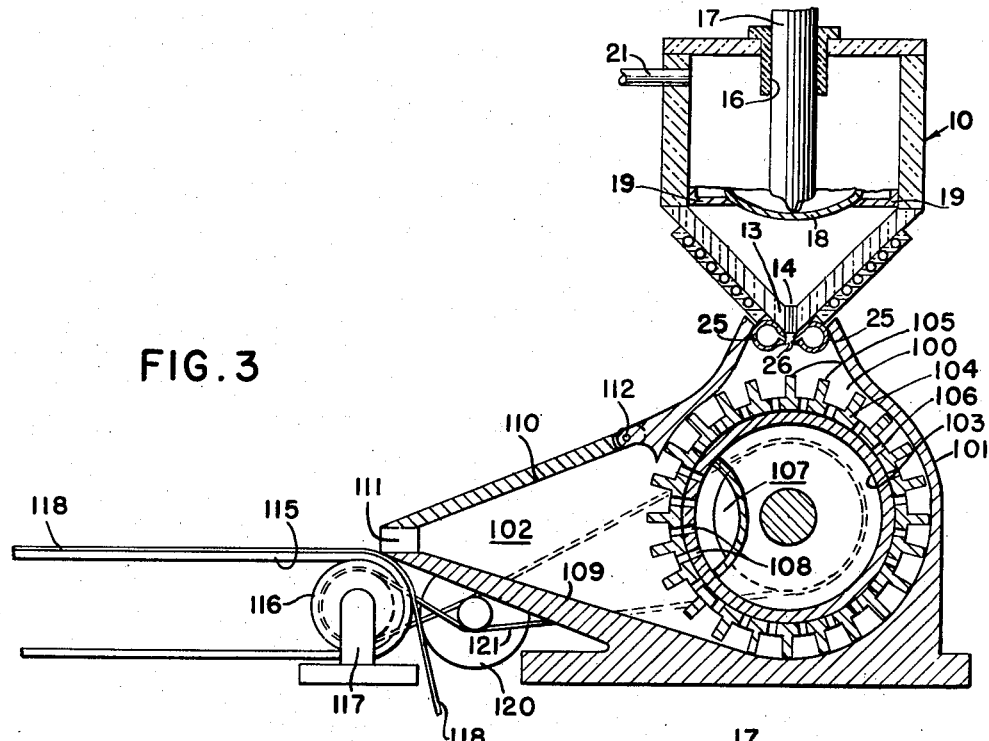
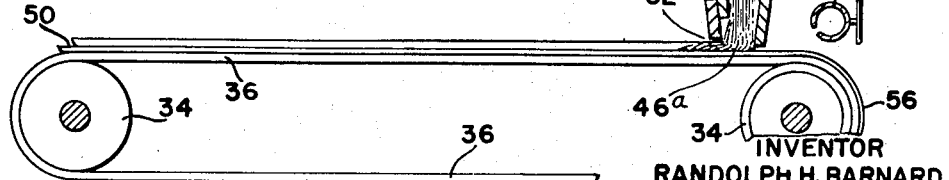
INVENTOR
RANDOLPH H. BARNARD
BY-
Toulmin & Toulmin
ATTORNEYS Patented Aug. 15, 1950

2,518,744

UNITED STATES PATENT OFFICE 2,518,744

APPARATUS FOR MAKING STAPLE FIBER

Randolph H. Barnard, Toledo, Ohio, assignor, by mesne assignments, to Glass Fibers, Inc., Waterville, Ohio Application March 21, 1946, Serial No. 656,107

5 Claims. (Cl. 154—27)

This invention relates to an apparatus for making staple and bulk fibers and to a method of collecting the fiber and distributing the same in uniform or non-uniform layers. Particularly, the invention relates to a method and apparatus for making very light short-length fibers, particularly of glass, for producing heat insulating material which can be used as a bulk material or can be applied in bats, blankets, or boards.

An object of the invention is to provide an improved apparatus for drawing fibers of material, particularly glass fibers, and breaking them into short lengths to produce a mat arrangement of the fibers for use particularly as heat insulating material.

Another object of the invention is to provide an improved apparatus for drawing fibers, particularly from a body of glass, wherein the fibers are broken into short lengths and collected immediately thereafter for distribution in uniform layers to form bats or blankets of the material.

Still another object of the invention is to provide an improved apparatus and a method of producing bats or blankets of uniform thickness of short lengths of fibrous material, such as glass fiber, carried upon a sheet of backing material and applied thereto immediately after the drawing of the fibers and the breaking thereof so that the bats or blankets are formed in a continuous process, and which bats or blankets can be cut into predetermined sizes after forming thereof, or can be arranged in rolls of suitable length.

It is still another object of the invention to provide an improved apparatus for producing bulk staple fibers of glass.

Further objects and advantages will become apparent from the drawings and the following description.

Referring to the drawings:

Figure 3 is a vertical cross sectional view of a modified arrangement of apparatus for producing staple fibers and for collecting them as produced, and evenly distributing them to produce bats or blankets of the fibers;

Figure 4 is a vertical cross sectional view of a further modified arrangement of apparatus for producing staple fibers, particularly of glass, and for collecting and evenly distributing the fibers;

Figures 5, 6 and 7 illustrate various arrangements of orifices through which the molten material may be exuded in drawing the fibers or filaments therefrom.

The use of heat insulating bats or blankets, or the use of bulk heat insulating material, is currently a widespread practice. Small fibers or filaments of various materials produce excellent heat insulating qualities when they are manufactured in short lengths and matted into bats or blankets. The heat insulating value of the individual fibers will be relatively low, but the mass of matted fibers or filaments produce heat insulating qualities not found in the individual substances. This is particularly true of material such as fibers made of rock, glass, or other types of solid materials which have been drawn into fine filaments and broken into short lengths to produce staple fibers that can be arranged in a matted pad or blanket. Such materials are conventionally sold on the market under the names of rock wool or glass wool.

This invention is directed particularly to an improved apparatus for producing staple fibers of glass to produce the product known as glass wool. While glass is particularly referred to in this invention, it will be understood that other materials capable of being liquified and drawn into fine filaments in the manner referred to herein, can be substituted and used in the place of glass to accomplish like or similar purposes. Also, it is understood that the process is applicable to the production of metal wools wherein various metals or alloys thereof can be drawn and broken into staple fibers.

In the apparatus disclosed and described herein, the material from which the staple fibers is to be produced is heated, preferably by the use of induction heat, to bring the material into a viscous or substantially liquid condition. The molten material is then exuded through small orifices or slots and drawn into fine filaments as rapidly as the material is discharged through the orifices or slots. These fine filaments are then broken into short lengths to produce staple fiber which is collected beneath the heating furnace or crucible to bring the fibers into a generally matted condition. The collected fibers may then be discharge directly into suitable containers for use as bulk fiber, or the fibers can be distributed from the collecting means over the surface of a carrier agent to form bats or blankets of relatively uniform thickness of the fibrous materials. The bats or blankets thus formed are produced by a continuous process directly from the drawn fibers or filaments.

Figure 2:
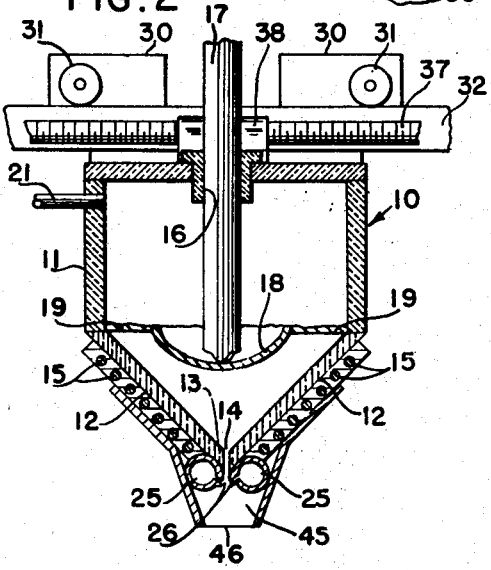
Figure 2 is a vertical cross sectional view through the furnace illustrated in Figure 1.

In Figure 2 there is illustrated a heating crucible or furnace in which material can be heated to a molten condition. Fibers or filaments of material can then be drawn from the molten body of material within the furnace for subsequent collection and distribution as heretofore mentioned.

The furnace or crucible 10, may consist of a closed metal chamber 11 that preferably is constructed of platinum or a platinum alloy. The furnace 10 has a converging bottom wall 12 that may be brought to an apex 13. Along the apex of the bottom wall 12, there is provided a plurality of small openings or orifices 14 through which the molten material within the furnace 10 may exude.

The bottom wall of the furnace 10 may be heated by suitable electric heating means 15 which preferably consist of a high frequency induction coil for heating the metal wall 12 of the furnace. The heating coil of the heating means is therefore connected to a suitable source of high frequency energy for this purpose.

Figure 1:
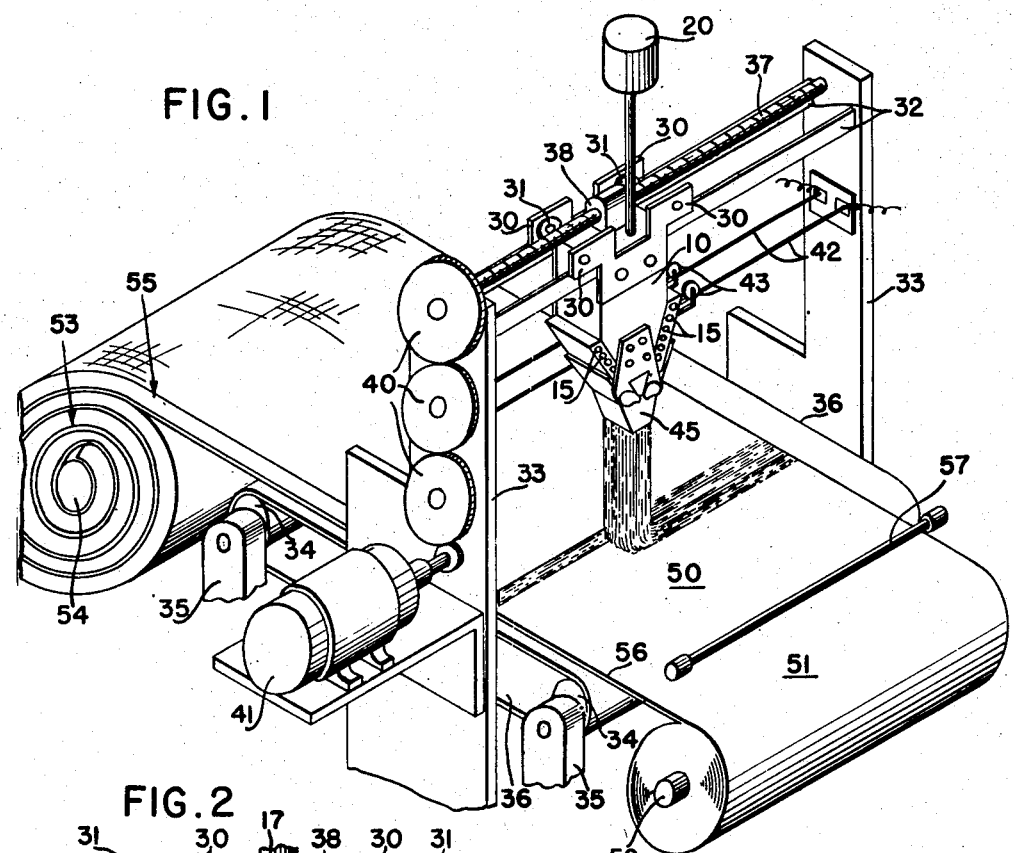
Figure 1 is a perspective elevational view of an apparatus for producing staple fibers in accordance with this invention and for distributing fibers in a uniform depth to produce bats or blankets of the fibers.

The furnace 10, may be fed with material for melting therein through a suitable opening 16 in the top wall thereof, and as illustrated in Figure 2, the material consists of a rod 17 passing through the opening 16. In this instance the rod 17 is a glass rod that rests upon a metal plate 18 supported within the furnace 10 by means of a plurality of radially extending arms 19 secured to the side wall of the furnace 10. The lower end of the glass rod 17 is heated by conduction and radiation from the body of molten glass within the furnace and the rod 17 gradually settles into the furnace as the end thereof passes into a molten condition. Any suitable means for feeding the rod 17 downwardly into the furnace 10 can be provided, for example, a weight 20 can be placed upon the upper end of the rod as illustrated in Figure 1 for the purpose of urging the rod downwardly into the furnace 10.

The interior of the furnace 10 may be maintained under pressure to force the molten glass from within the furnace. A pressure connection 21 may be provided in the furnace 10 for this purpose. The pressure maintained within the furnace 10 is controlled at a relatively constant value to establish and maintain a pressure differential between the interior of the furnace and the exterior thereof on the discharge side of the orifice openings 14 to cause the glass within the furnace 10 to exude through the orifices 14.

The glass rod 17 is preferably fed into the furnace 10 at the same rate that the glass is discharged therefrom from the openings 14 to maintain a relatively constant head of glass in the furnace. Suitable controls can be provided for regulating the rate of feeding of the glass rod to maintain a predetermined level of molten glass within the furnace.

To draw the glass exuded through the openings 14 into fine filaments, there is provided on each side of the orifices 14 a gaseous pressure conduit 25. The gaseous pressure conduits each contain a series of openings 26 therein that form a plurality of jets of gaseous material discharging from the conduits 25.

In Figure 2 it will be noted that the jets 26 of the conduits 25 are directed toward one another but angularly downwardly from the openings 14 in the furnace 10. Thus, there is produced within the area between the point of engagement of the angularly downwardly directed jets of gas discharging from the nozzles 26 and the discharge end of the openings 14 an area of reduced pressure caused by the downwardly acting jets from the conduits 25. The jets of gas discharging from the nozzles engage the glass exuding through the orifices 14 and draw the same in a downward movement into fine filaments. Also, since the jets discharging from the conduits 25 cross one another, a swirling gas motion is produced below the point of engagement of the gas streams by which the glass filaments are broken into short lengths as rapidly as formed, thus, the glass exuded from the orifice 14 and drawn into filaments by the jets discharging from the conduits 25 may be said to be blasted into short fine filaments or staple fiber.

Any suitable gaseous material can be used for producing the jets, such as air, acetylene, carbon dioxide, or any other inexpensive inert gas.

While it has heretofore been referred to that the openings 14 are in the form of orifices, inferring that they are small round holes, as illustrated in Figure 5, yet a similar result can be obtained by arranging the openings 14 in the form of narrow slots 14a as illustrated in Figure 7. In this instance, the ribbons of glass exuded through the openings 14a will be drawn or blasted into short length fibers by the jets of gas discharging from the conduits 25.

The pressure maintained within the furnace 10 allows for maintaining a lower temperature of the body of molten glass within the furnace to obtain a predetermined flow of glass through the openings 14. It has been found that a lower working temperature of the body of molten glass produces a higher strength in the filament drawn therefrom. A more full and complete disclosure of the method of drawing glass fibers or filaments by the use of a pressure differential between the inlet side of the openings 14 and the outlet side of the same, is found in the applications of Everett J. Cook, Serial Nos. 634,284, filed December 11, 1945, and 634,285, filed December 11, 1945, now U. S. Patent No. 2,514,627, assigned to the assignee of this application.

The furnace or heating crucible illustrated in Figure 2 may be carried in a suitable apparatus for distributing the staple fibers produced therefrom upon a suitable carrier for manufacturing bats or blankets of the material, such bats or blankets being used for heat insulating purposes.

Also, it will be understood that the fibers as produced by the furnace illustrated in Figure 2 can be collected in suitable containers and used as bulk fiber.

In Figure 1 the furnace 10 is provided with a pair of carrier members 30 each provided with suitable rolls or wheels 31 that are supported upon a pair of parallel tracks 32, thus suspending the furnace 10 from the tracks 32. The tracks 32 may be carried upon the machine frame members 33 that are positioned on opposite sides of the machine.

The machine frame members 33 are also adapted to support a number of rolls or cylinders 34, mounted upon bearing members 35 carried by the machine frame. An endless belt 36 extends between the cylinders 34. Either of the cylinders 34 is driven by any suitable means for moving the belt at a relatively constant speed during operation of the machine. A suitable arrangement could be provided in the form of an electric motor with a conventional gear reducing drive to one of the cylinders 34 which may control the movement of the belt at any desired speed depending upon the setting of the gear reducing drive. Any number of gear reducing drives are well known, such as the conventional transmission gears or hydraulic variable speed mechanisms or mechanical gear reducing mechanisms, any one of which can be used for the purpose of driving the belt 36 at a relatively constant speed.

A worm or screw 37 extends between the frame members 33 and passes through an internally threaded boss 38 attached to the furnace 10 whereby rotation of the screw 37 alternately in opposite directions will cause the furnace 10 to reciprocate between the frame members 33 and thereby move the furnace transversely across the belt 36. The worm or screw 37 may be driven from a suitable gear train 40 from an electric motor 41 which may be of the reversible type. Suitable controls may be provided and actuated by the reciprocable movement of the furnace 10 to automatically cause the motor 41 to alternately change its direction of rotation when the furnace alternately approaches opposite sides of the machine frame, thus automatically causing the furnace 10 to traverse the belt 36.

The heating element 15 of the furnace 10 may be supplied with electric current from the conductors 42 extending between the machine frame members 33. Suitable sliding contacts or roller contacts 43 are carried by the furnace for engaging the conductors 42 during the reciprocable movement of the furnace 10.

Beneath the furnace 10 there is provided a collecting chamber 45 into which the staple fiber produced in the manner heretofore referred to is collected for distribution upon the belt 36. The collecting chamber 45 is provided with tapering side walls whereby to form a nozzle effect for causing the staple fibers collected therein to discharge uniformly throughout the length and breadth of the opening 46 provided in the collecting chamber 45.

To produce pads or blankets of heat insulating material, a backing sheet 50 is caused to move over the belt 36. The backing sheet 50 may be a heavy kraft paper that is coated with a waterproofing agent in conventional manner to prevent moisture absorption by the paper. It is, of course, understood that other backing agents or materials can be used in place of the kraft paper referred to.

The backing sheet, or base sheet, is supplied in rolls, such as the roll 51 that is supported upon a suitable spindle 52 at one end of the endless belt 36. The sheet 50 is directed across the upper surface of the belt 36 and the formed product, that is the heat insulating pad or blanket, may be wound into a roll at the opposite end of the belt 36, such as the roll 53. Any suitable mechanism may be provided for rotating the shaft 54 carrying the roll 52 to take up the heat insulating blanket 55 as rapidly as it is produced. To cause the staple fiber to adhere to the surface of the sheet 50 an adhesive agent is supplied to the upper surface 56 of the sheet 50. This adhesive agent may be distributed transversely across the width of the sheet 50 by means of a distributing head 57. The adhesive may be of any of the general types conventionally used for the purpose, and may be the waterproofing agent used for waterproofing the paper sheet 50.

In any event, the adhesive agent applied upon the surface of the sheet 50 remains sufficiently tacky to allow the staple fiber directed upon the surface of the sheet 50 to adhere thereto.

As illustrated in Figure 1, in the method of producing a heat insulating pad or blanket, consisting of a backing or base sheet and a uniform thickness of staple fiber, such as glass fiber, the sheet 50 is moved across the belt 36, and if desired, may be driven by the belt 36. As the sheet 50 passes beneath the furnace 10, the furnace is reciprocated transversely across the sheet 50 to discharge staple fiber collected in the collecting chamber 45 upon the surface of the sheet 50. The thickness of the matting of staple fiber placed upon the surface of the sheet 50 is preferably determined by the speed of movement of the sheet 50 relative to the furnace 10 and the number of passes that the furnace 10 can make across the sheet 50 during the interval of time that any predetermined area is beneath the furnace 10. It is quite apparent that the entire thickness desired in the blanket can be obtained by a single pass of the furnace across the sheet 50 or a thickness can be one that is built up by numerous passes of the furnace across the sheet, depending directly upon the quantity of staple fiber discharged from the furnace 10 and thickness desired in the blanket 55.

In Figure 4 there is illustrated a slightly modified arrangement of means for controlling the thickness of the mat of staple fiber that is allowed to collect upon the surface of the sheet 50.

In the modified arrangement, the furnace 10 is of the same type as heretofore described with reference to Figures 1 and 2. The rolls 34 carry the belt 36 in the same manner as heretofore described and a backing or base sheet 50 is carried over the belt 36 in substantially the same manner as heretofore mentioned. The adhesive material may be supplied to the upper surface 56 of the sheet 50 by the same type of distributing head 57 as described with reference to Figure 1.

In the modified arrangement shown in Figure 4 the collecting chamber 45a extends from beneath the furnace 10 to a position immediately adjacent the belt 36 and the sheet 50 thereon. The collecting chamber 45a is, therefore, adapted to be continuously filled with stable fiber produced from the furnace 10 so that there is at all times, a substantial quantity of staple fiber within the collecting chamber 45a. The gaseous pressure discharging from the conduits 25 causes the staple fiber in the collecting chamber 45a to be discharged through the opening 46a, which opening is immediately above the backing sheet 50.

The collecting chamber 45a is provided with a rear wall 60 that is in close proximity to the surface of the sheet 50 to substantially prevent any discharge of staple fiber between the wall 60 and the sheet 50. The forward wall 61 of the collecting chamber 45a is positioned with the lower edge thereof spaced from the upper surface of the sheet 50, thereby providing an opening 62 through which staple fiber may discharge from the collecting chamber 45a. Forward movement of the sheet 50, that is, movement in the lefthand direction, as disclosed in Figure 4, will cause the staple fiber to be carried forwardly from the collecting chamber at a thickness on the sheet 50 governed by the height of the opening 62. The opening 62 may be controlled by the position of an adjustable plate 63 carried upon the lower end of the front wall 61 of the collecting chamber 45a.

In Figure 3 there is shown a modified arrangement of an apparatus for collecting the staple fiber as discharged from the furnace and for distributing the staple fiber in relatively uniform layers upon a carrier sheet.

In the apparatus illustrated in Figure 3, the furnace 10 is substantially the same as heretofore disclosed and described, the staple fiber being discharged beneath the conduits 25 in the same manner as heretofore disclosed.

The staple fiber, however, is discharged into a collecting chamber 100 that is provided with a substantially cylindrical portion 101 and a tapered chamber portion 102. A drum 103 is positioned within the cylindrical portion 101 of the collecting chamber 100 and carries a rotatable drum 104 thereon. The drum 104 is provided with a plurality of radially extending projections 105 that have the ends thereof in close proximity of the inner surface of the cylindrical portion 101 of the collecting chamber when the member 104 is rotated. The drum 104 is also provided with a plurality of radial openings 106 therein positioned between each of the projections 105.

The openings 106 provide means through which air or other suitable gas under pressure can be discharged from a gas pressure chamber 107 positioned within the drum 103, suitable openings 108 being provided in the drum 103 to allow discharge of gas under pressure when the openings 106 align with the openings 108.

The tapered chamber portion 102 of the collecting chamber 100 may be provided with a stationary lower wall 109 and a movable upper wall 110 so that an opening 111 provided between the walls 109 and 110 can be varied in width. The wall 110 may be carried upon a pivot shaft 112 for the purpose of allowing adjustment thereof.

The discharge opening 111 from the chamber 102 is positioned adjacent an endless belt 115 as carried over the drum or roll 116 supported upon the bearing supports 117. A backing sheet, or base sheet 118 may be carried over the endless belt 115 in the same manner as heretofore referred to with reference to the backing sheet 50 and adhesive may be supplied to the upper or outer surface thereof being carried forward over the roll 116.

The roll or drum 116 as well as the drum 104 may be driven by an electric motor 120 by means of a belt 121 passing between the respective drums.

The staple fiber produced by and discharged from the furnace 10 of the apparatus shown in Figure 3, is collected upon the drum 104 between the teeth or protrusions 105 thereon. The staple fiber is thus carried between the drum 104 and the wall 101 of the collecting chamber 100 during clockwise rotation of the drum 104 until the openings 106 in the drum 104 align with the openings 108 in the drum 103. At this time the staple fiber is blown from the surface of the drum 104 into the tapered chamber 102, thus causing the staple fiber to bank into the discharge end of the chamber 102 and to discharge through the opening 111 in a matted pad of uniform thickness. The matted pad discharged from the opening 111 will be immediately picked up by the backing member 118 and carried forward from the opening 111, thereby forming a bat or blanket of staple fiber of uniform thickness which can be used for heat insulating purposes.

It is to be understood that if desired, the backing sheet can be omitted and thereby obtain a pad of staple fiber of uniform thickness that is discharged directly upon the belt 115 which may be used for any purpose desired.

While the apparatus disclosed and described herein and the method performed by that apparatus, constitute preferred forms of the invention, yet, it will be understood that the apparatus and the method performed thereby is capable of alteration without departing from the spirit of the invention, and that all modifications that fall within the scope of the appended claims are intended to be included herein.

Having thus fully described my invention, what I claim as new and desire to secure by Letters Patent is:

1. Apparatus for producing staple fiber that consists of, a heating chamber for receiving and maintaining a material in a molten condition and having a plurality of openings in one wall thereof through which the molten material is exuded, gas conducting means at opposite sides of said heating chamber openings having discharge openings therein at opposite sides of the said heating chamber openings immediately at the discharge end of the said heating chamber openings and against the streams issuing from the said heating chamber openings directing angularly converging blasts of gas under high pressure upon opposite sides of the streams of molten material immediately at the discharge end of said openings as the streams issue from the openings, said streams of gas producing attenuation of the streams of molten material into filament-like fibers and simultaneously with said attenuation breaking the attenuated fibers into short fiber lengths, and wall means forming a closed gas pressure retaining collecting chamber in which said last-mentioned means is positioned at one end thereof whereby to collect the short-length fibers at their source of production, said wall means of said collecting chamber converging in the direction of movement of the fibers through the chamber reducing the transverse cross-section of the chamber regularly toward the discharge and thereof, to retard the discharge of fibers from the chamber and build up a collection of fibers of substantial depth in the discharge end of said collecting chamber, said gas introduced into said collecting means producing pressure within said chamber acting on said collected fibers to compact the fibers to a determined density in the discharge end of said collecting chamber and forcefully move the so-compacted fibers from the collecting chamber in a mat of determined density and of a size equal to that of the discharge opening of said chamber.

2. Apparatus for producing staple fiber that consists of, a heating chamber for receiving and maintaining a material in a molten condition and having a plurality of openings in one wall thereof through which the molten material is exuded, gas conducting means at opposite sides of said heating chamber openings having discharge openings therein at opposite sides of the said heating chamber openings immediately at the discharge end of the said heating chamber openings and against the streams issuing from the said heating chamber openings directing angularly converging blasts of gas under high pressure upon opposite sides of the streams of molten material immediately at the discharge end of said openings as the streams issue from the openings, said streams of gas producing attenuation of the streams of molten material into filament-like fibers and simultaneously with said attenuation breaking the attenuated fibers into short fiber lengths, and wall means forming a closed gas pressure retaining collecting chamber in which said last-mentioned means is positioned at one end thereof whereby to collect the short-length fibers at their source of production, said wall means of said collecting chamber converging in the direction of movement of the fibers through the chamber reducing the transverse cross-section of the chamber regularly toward the discharge end thereof to retard the discharge of fibers from the chamber and build up a collection of fibers of substantial depth in the discharge end of said collecting chamber, said gas introduced into said collecting means producing pressure within said chamber acting on said collected fibers whereby to compact the fibers to a determined density in the discharge end of said collecting chamber and forcefully move the so-compacted fibers from the collecting chamber in a mat of determined density and of a size equal to that of the discharge opening of said chamber, at least one of said walls of said collecting chamber being movable relatively to the other of said walls whereby to change the cross-sectional area of the discharge opening of said chamber.

3. Apparatus for producing a fibrous mat that includes, a heating chamber for receiving and maintaining a material in a molten condition and having a plurality of openings in one wall thereof through which the molten material is exuded, gas conducting means at opposite sides of said heating chamber openings having discharge openings therein at opposite sides of the said heating chamber openings immediately at the discharge end of the said heating chamber openings and against the streams issuing from the said heating chamber openings directing angularly converging blasts of gas under high pressure upon opposite sides of the streams of molten material immediately at the discharge end of said openings as the streams issue from the openings, said streams of gas producing attenuation of the streams of molten material into filament-like fibers and simultaneously with said attenuation breaking the attenuated fibers into short fiber lengths, and wall means forming a closed gas pressure retaining collecting chamber in which said last-mentioned means is positioned at one end thereof whereby to collect the short-length fibers at their source of production, said wall means of said collecting chamber converging in the direction of movement of the fibers through the chamber reducing the transverse cross-section of the chamber regularly toward the discharge end thereof to retard the discharge of fibers from the chamber and build up a collection of fibers of substantial depth in the discharge end of said collecting chamber, said gas introduced into said collecting means producing pressure within said chamber acting on said collected fibers whereby to compact the fibers to a determined density in the discharge end of said collecting chamber and forcefully move the so-compacted fibers from the collecting chamber in a mat of determined density and of a size equal to that of the discharge opening of said chamber, means for moving a backing sheet adjacent the discharge end of said collecting chamber to receive the fibers in their compacted form directly from the discharge opening of said collecting chamber at the predetermined mat density.

4. Apparatus for producing staple fiber that consists of, a heating chamber for receiving and maintaining a material in a molten condition and having a plurality of openings in one wall thereof through which the molten material is exuded, gas conducting means at opposite sides of said heating chamber openings having discharge openings therein at opposite sides of the said heating chamber openings immediately at the discharge end of the said heating chamber openings and against the streams issuing from the said heating chamber openings directing angularly converging blasts of gas under high pressure upon opposite sides of the streams of molten material immediately at the discharge end of said openings as the streams issue from the openings, said streams of gas producing attenuation of the streams of molten material into filament-like fibers and simultaneously with said attenuation breaking the attenuated fibers into short fiber lengths, wall means forming a closed gas pressure retaining collecting chamber in which said last-mentioned means is positioned at one end thereof whereby to collect the short-length fibers at their source of production, said wall means of said collecting chamber converging in the direction of movement of the fibers through the chamber reducing the transverse cross-section of the chamber regularly toward the discharge end thereof to retard the discharge of fibers from the chamber and build up a collection of fibers of substantial depth in the discharge end of said collecting chamber, said gas introduced into said collecting means producing pressure within said chamber acting on said collected fibers whereby to compact the fibers to a determined density in the discharge end of said collecting chamber and forcefully move the so-compacted fibers from the collecting chamber in a mat of determined density and of a size equal to that of the discharge opening of said chamber, means for moving a backing sheet adjacent the discharge end of said collecting chamber to receive the fibers in their compacted form directly from the discharge opening of said collecting chamber at the predetermined mat density, and means for applying an adhesive material upon said backing sheet on the side thereof to receive said fibers prior to the time said fibers are received by said sheet.

5. Apparatus for producing a fibrous mat that includes, a heating chamber for receiving and maintaining a material in a molten condition and having a plurality of openings in one wall thereof through which the molten material is exuded, gas conducting means at opposite sides of said heating chamber openings having discharge openings therein at opposite sides of the said heating chamber openings immediately at the discharge end of the said heating chamber openings and against the streams issuing from the said heating chamber openings directing angularly converging blasts of gas under high pressure upon opposite sides of the streams of molten material immediately at the discharge end of said openings as the streams issue from the openings, said streams of gas producing attenuation of the streams of molten material into filament-like fibers and simultaneously with said attenuation breaking the attenuated fibers into short fiber lengths, wall means forming a closed gas pressure retaining collecting chamber in which said last-mentioned means is positioned at one end thereof whereby to collect the short-length fibers at their source of production, said wall means of said collecting chamber converging in the direction of movement of the fibers through the chamber reducing the transverse cross-section of the chamber regularly toward the discharge end thereof to retard the discharge of fibers from the chamber and build up a collection of fibers of substantial depth in the discharge end of said collecting chamber, said gas introduced into said collecting means producing pressure within said chamber acting on said collected fibers whereby to compact the fibers to a determined density in the discharge end of said collecting chamber and forcefully move the so-compacted fibers from the collecting chamber in a mat of determined density and of a size equal to that of the discharge opening of said chamber, at least one of said walls of said collecting chamber being movable relatively to the other of said walls whereby to change the cross-sectional area of the discharge opening of said chamber, means for moving a backing sheet adjacent the discharge end of said collecting chamber to receive the fibers in their compacted form directly from the discharge opening of said collecting chamber at the predetermined mat density, and means for applying an adhesive material upon said backing sheet on the side thereof to receive said fibers prior to the time said fibers are received by said sheet.

RANDOLPH H. BARNARD.

REFERENCES CITED

The following references are of record in the file of this patent:

UNITED STATES PATENTS

| Number | Name | Date |
|---|---|---|
| 299,111 | Burns | May 27, 1884 |
| 1,270,250 | Schenkelberger | June 18, 1918 |
| 1,542,559 | Kopp | June 16, 1925 |
| 1,864,317 | Powell | June 21, 1932 |
| 2,081,060 | Modigliani | May 18, 1937 |
| 2,133,236 | Slayter et al. | Oct. 11, 1938 |
| 2,175,224 | Slayter | Oct. 10, 1939 |
| 2,219,346 | Thomas et al. | Oct. 29, 1940 |
| 2,224,466 | Baker et al. | Dec. 10, 1940 |
| 2,229,489 | Barnard | Jan. 21, 1941 |
| 2,230,270 | Simpson | Feb. 4, 1941 |
| 2,286,653 | Siegfried | June 16, 1942 |
| 2,286,903 | Dockerty | June 16, 1942 |
| 2,287,006 | Kleist et al. | June 16, 1942 |
| 2,291,289 | Slayter et al. | July 28, 1942 |
| 2,331,944 | Von Pazsiczky et al. | Oct. 19, 1943 |
| 2,333,218 | Pazsiczky | Nov. 2, 1943 |
| 2,335,757 | Hall | Nov. 30, 1943 |
| 2,429,486 | Rheinhardt | Oct. 21, 1947 |